US012779871B2

(12) United States Patent
Satake et al.

(10) Patent No.: US 12,779,871 B2
(45) Date of Patent: Nov. 3, 2026

(54) INKJET RECORDING APPARATUS

(71) Applicant: KYOCERA Document Solutions Inc., Osaka (JP)

(72) Inventors: Kenichi Satake, Osaka (JP); Shogo Yoneda, Osaka (JP); Hideki Ishida, Osaka (JP); Shun Tsuboi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 89 days.

(21) Appl. No.: 19/085,491

(22) Filed: Mar. 20, 2025

(65) Prior Publication Data

US 2025/0303728 A1 Oct. 2, 2025

(30) Foreign Application Priority Data

Mar. 28, 2024 (JP) ................................. 2024-052925

(51) Int. Cl.

*B41J 2/175* (2006.01)
*B41J 2/165* (2006.01)
*B41J 2/19* (2006.01)
*B41J 2/20* (2006.01)

(52) U.S. Cl.

CPC ....... *B41J 2/17596* (2013.01); *B41J 2/16507* (2024.05); *B41J 2/19* (2013.01); *B41J 2/16508* (2013.01); *B41J 2/16523* (2013.01); *B41J 2/16532* (2013.01); *B41J 2/16585* (2013.01); *B41J 2002/16594* (2013.01); *B41J 2/20* (2013.01); *B41P 2235/27* (2013.01)

(58) Field of Classification Search

CPC ...... B41J 2/17596; B41J 2/16507; B41J 2/19; B41J 2/16508; B41J 2/16523; B41J 2/16532; B41J 2/16585; B41J 2/20; B41J 2002/16594; B41P 2235/27

See application file for complete search history.

(56) References Cited

U.S. PATENT DOCUMENTS

| | | | | |
|---|---|---|---|---|
| 2012/0194620 | A1* | 8/2012 | Matsumoto | B41J 2/16523 347/85 |
| 2018/0001655 | A1 | 1/2018 | Matsuyama | B41J 2/17596 |
| 2018/0043691 | A1* | 2/2018 | Udagawa | B41J 2/17596 |
| 2018/0257372 | A1 | 9/2018 | Hanagami et al. | B41J 2/14 |
| 2021/0252865 | A1* | 8/2021 | Hamamoto | B41J 2/16508 |

FOREIGN PATENT DOCUMENTS

| | | | |
|---|---|---|---|
| JP | 2015-166194 | A | 9/2015 |
| JP | 2018-001516 | A | 1/2018 |
| JP | 2018-149685 | A | 9/2018 |

* cited by examiner

*Primary Examiner* — Henok D Legesse

(74) *Attorney, Agent, or Firm* — Stein IP, LLC

(57) ABSTRACT

An inkjet recording apparatus includes an ink container, one or more recording heads, an ink flow path, a negative pressure regulation valve, a cap, a suction pump, and a waste ink discharge path. The negative pressure regulation valve includes an inflow-side pressure chamber, an outflow-side pressure chamber, a communication hole, a first outflow hole and a second outflow hole respectively formed in the outflow-side pressure chamber so as to be below and above the communication hole, and respectively communicating with the first outflow path and the second outflow path, and a valve member that opens and closes the communication hole. The first outflow path communicates with the recording heads. The second outflow path communicates with an inside of the cap or a waste ink discharge path, and is provided with an opening/closing valve.

6 Claims, 3 Drawing Sheets

INKJET RECORDING APPARATUS

INCORPORATION BY REFERENCE

This application is based on and claims the benefit of priority from Japanese Patent Application No. 2024-052925 filed on Mar. 28, 2024, the contents of which are hereby incorporated by reference.

BACKGROUND

The present disclosure relates to a negative pressure regulation valve for use in an inkjet recording apparatus, and an inkjet recording apparatus including the negative pressure regulation valve.

In inkjet recording apparatuses, it is important to constantly maintain the ink ejection state and conditions to ensure high print quality. For this purpose, a configuration is adopted in which an ink flow path connecting an ink container and a recording head is provided with a pressure regulating portion (a negative pressure regulation valve, a damper, or the like) that regulates pressure by storing ink.

SUMMARY

According to one aspect of the present disclosure, an inkjet recording apparatus includes an ink container, one or more recording heads, an ink flow path, a negative pressure regulation valve, a cap, a suction pump, and a waste ink discharge path. The ink container contains ink. The recording heads include a plurality of nozzles that eject ink. The ink flow path allows communication between the ink container and the recording heads. The negative pressure regulation valve is connected to the ink flow path. The cap is attached to an ink ejection surface of the recording heads and capable of forming a sealed space between the ink ejection surface and the cap. The suction pump sucks air from an inside of the cap. The waste ink discharge path discharges liquid having been sucked by the suction pump into the inside of the cap. The inkjet recording apparatus is capable of executing, with the cap attached to the ink ejection surfaces, a suction purge process in which the suction pump sucks air from the inside of the sealed space. The negative pressure regulation valve includes an inflow-side pressure chamber, an outflow-side pressure chamber, a communication hole, a first outflow hole, a second outflow hole, and a valve member. The inflow-side pressure chamber includes an ink inflow hole that communicates with an ink inflow path that is the ink flow path on a side of the ink container. The outflow-side pressure chamber communicates with an ink outflow path that is the ink flow path on a side of the recording heads. The communication hole allows communication between the inflow-side pressure chamber and the outflow-side pressure chamber. The first outflow hole is formed in the outflow-side pressure chamber so as to be below the communication hole, and communicates with the first outflow path that is the ink outflow path. The second outflow hole is formed in the outflow-side pressure chamber so as to be above the communication hole, and communicates with the second outflow path that is the ink outflow path. The valve member is inserted in the communication hole and movable, in accordance with change of pressure inside the outflow-side pressure chamber, to a closing position for closing the communication hole and an opening position for opening the communication hole. The first outflow path communicates with the recording heads. The second outflow path communicates with the inside of the cap or the waste ink discharge path between the suction pump and the cap, and is provided with an opening/closing valve that opens and closes the second outflow path.

DETAILED DESCRIPTION

[1. Configuration of Inkjet Recording Apparatus]

Figure 1:
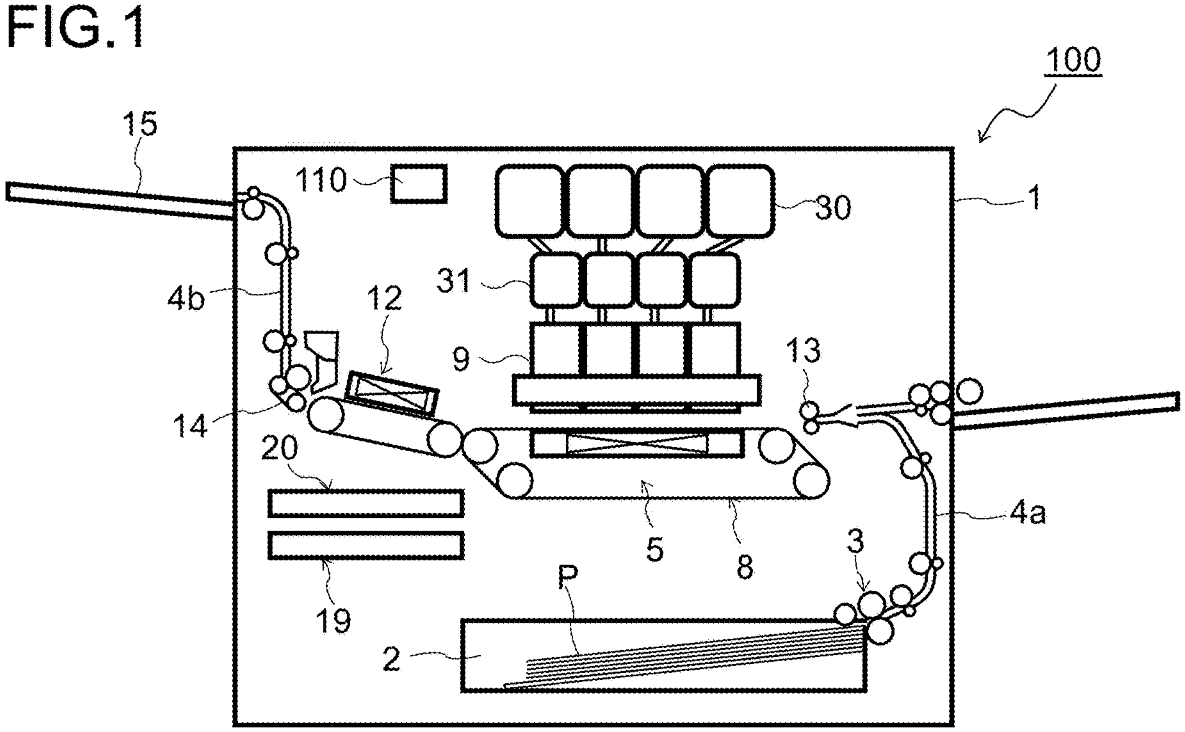
FIG. 1 is an explanatory diagram schematically illustrating a configuration of a printer as an inkjet recording apparatus according to one embodiment of the present disclosure.

Hereinafter, embodiments of the present disclosure will be described with reference to the accompanying drawings. FIG. 1 is an explanatory diagram schematically illustrating a configuration of a printer 100 as an inkjet recording apparatus according to one embodiment of the present disclosure. The printer 100 includes a sheet feeding cassette 2 that is a sheet storage portion. The sheet feeding cassette 2 is disposed in a lower part inside a printer main body 1. Inside the sheet feeding cassette 2, a sheet P is stored as one example of a recording medium.

On a downstream side of the sheet feeding cassette 2 in a sheet conveyance direction, that is, on an upper right side of the sheet feeding cassette 2 in FIG. 1, a sheet feeding device 3 is disposed. By the sheet feeding device 3, sheets P are sent out, one by one separately, toward the upper right side of the sheet feeding cassette 2 in FIG. 1.

The printer 100 includes a first sheet conveyance path **4*a* disposed inside thereof. The first sheet conveyance path 4*a* is disposed, with respect to the sheet feeding cassette 2, on the upper right side, toward which a sheet P is fed from the sheet feeding cassette 2. A sheet P sent out from the sheet feeding cassette 2 is, by the first sheet conveyance path 4*a*, conveyed vertically upward along a side surface of the printer main body 1**.

At a downstream end of the first sheet conveyance path **4*a* in the sheet conveyance direction, a pair of registration rollers 13 are disposed. Furthermore, immediately close to the pair of registration rollers 13 on a downstream side thereof in the sheet conveyance direction, a first conveyance unit 5 and a recording portion 9 are disposed. A sheet P sent out from the sheet feeding cassette 2 passes through the first sheet conveyance path 4*a* and reaches the pair of registration rollers 13. The pair of registration rollers 13, while correcting skew feeding of the sheet P, send out the sheet P toward the first conveyance unit 5 (in particular, a first conveyance belt 8 which will be described later), with timing coordinated with an ink ejecting operation that the recording portion 9** executes.

Figure 2:
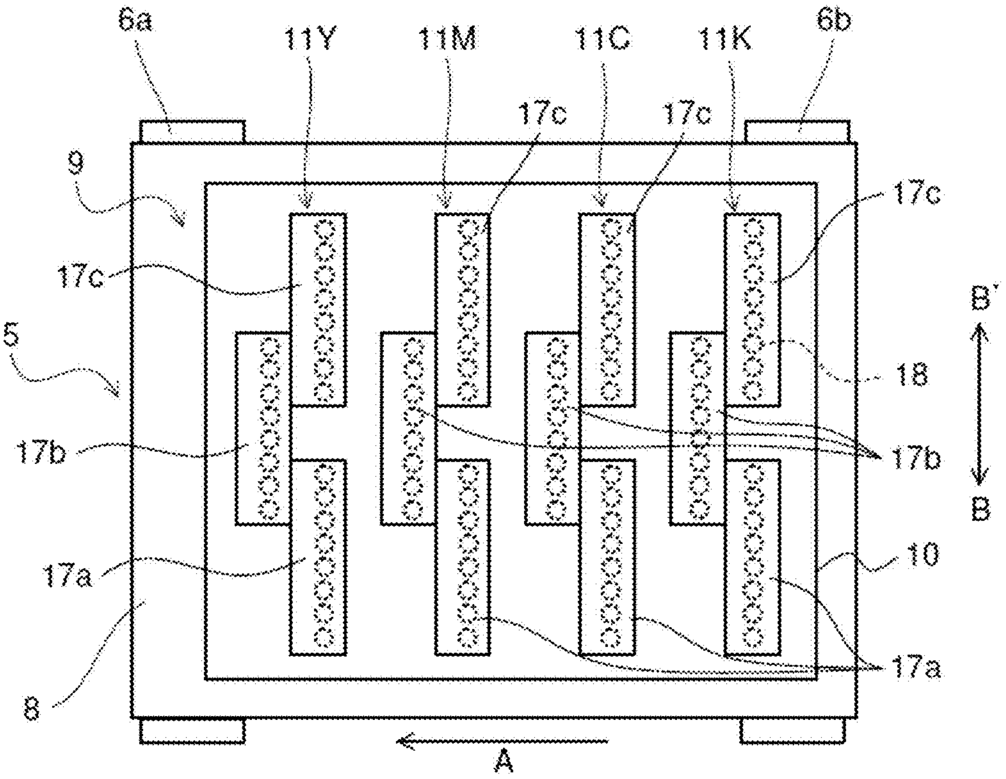
FIG. 2 is a plan view of a recording portion that the printer includes.

FIG. 2 is a plan view of the recording portion 9. The recording portion 9 includes a head housing 10 and line heads 11Y, 11M, 11C, and 11K. The line heads 11Y to 11K are held in the head housing 10 at such a height that maintains a predetermined distance (e.g., 1 mm) from a conveyance surface of the first conveyance belt 8, which is an endless belt stretched by a plurality of rollers including a driving roller 6*a*, a driven roller 6*b*, and a tension roller (unillustrated). The driving roller 6*a* causes the first conveyance belt 8 to rotate in the conveyance direction (an arrow-A direction) of a sheet P.

The line heads 11Y to 11K each have a plurality of (here, three) recording heads 17*a* to 17*c*. The recording heads 17*a* to 17*c* are arranged in a staggered manner along a sheet width direction (an arrow-BB' direction) that is orthogonal to the sheet conveyance direction (the arrow-A direction). The recording heads 17*a* to 17*c* each have a plurality of ink ejection ports 18 (nozzles). The ink ejection ports 18 are arranged at regular intervals in a recording-head width direction, that is, the sheet width direction (the arrow-BB' direction). From each of the line heads 11Y to 11K, via the ink ejection ports 18 of the recording heads 17*a* to 17*c*, ink in yellow (Y), magenta (M), cyan (C), or black (K) is ejected toward the sheet P conveyed by the first conveyance belt 8.

The recording heads 17*a* to 17*c* constituting each of the line heads 11C to 11K are supplied, from an ink container 30 (see FIG. 1), with ink in one of the four colors (yellow, magenta, cyan, and black) corresponding to the colors of the line heads 11C to 11K. Between the ink container 30 and the recording heads 17*a* to 17*c*, a negative pressure regulation valve 31 (see FIG. 1) is coupled. A detailed configuration of the negative pressure regulation valve 31 will be described later.

Based on a control signal from a control device 110 (see FIG. 1), each of the recording heads 17*a* to 17*c*, in accordance with image data received from an external computer, ejects ink through the ink ejection ports 18 toward a sheet P, which is conveyed by being held by suction on the conveyance surface of the first conveyance belt 8. Thereby, on the sheet P held on the first conveyance belt 8, a color image is formed by superimposing inks in yellow, magenta, cyan, and black on one another.

Referring back to FIG. 1, the sheet P having been sent out by the pair of registration rollers 13 to the first conveyance unit 5 is conveyed by the first conveyance belt 8 to a position at which it faces the recording portion 9 (in particular, the recording heads 17*a* to 17*c*, which will be described later). By the recording portion 9 ejecting ink onto the sheet P, an image is recorded on the sheet P. The ejection of ink in the recording portion 9 is controlled by the control device 110 incorporated in the printer 100.

In the sheet conveyance direction, on a downstream side (a left side in FIG. 1) of the first conveyance unit 5, a second conveyance unit 12 is disposed. The sheet P, having had an image recorded thereon by the recording portion 9, is then sent to the second conveyance unit 12. The ink having been ejected onto a surface of the sheet P is dried while the sheet P is passing through the second conveyance unit 12.

In the sheet conveyance direction, at a position that is downstream of the second conveyance unit 12 and close to a left side surface of the printer main body 1, a decurler portion 14 is disposed. The sheet P, having had the ink dried through the second conveyance unit 12, is then sent to the decurler portion 14, where a curl having been generated in the sheet P is corrected.

In the sheet conveyance direction, at a position that is downstream of (in FIG. 1, above) the decurler portion 14, a second sheet conveyance path 4*b* is disposed. After passing through the decurler portion 14, if no duplex recording is to be performed, the sheet P passes through the second sheet conveyance path 4*b*, and is discharged onto a sheet discharge tray 15 disposed on an outside of the left side surface of the printer 100.

Further, below the second conveyance unit 12, a maintenance unit 19 and a cap unit 20 are disposed. When a purge is executed, the maintenance unit 19 horizontally moves to a position under the recording portion 9, wipes ink discharged through the ink ejection ports 18 of the recording heads 17*a* to 17*c*, and collects the wiped ink. Here, a purge refers to an operation of discharging thickened ink, foreign matter, bubbles, etc., from inside the ink ejection ports 18 by forcibly discharging ink from the ink ejection ports 18 of the recording heads 17*a* to 17*c*. To cap ink ejection surfaces of the recording heads 17*a* to 17*c*, the cap unit 20 horizontally moves to a position under the recording portion 9, and then further moves upward to be attached to lower surfaces of the recording heads 17*a* to 17*c*.

[2. Configuration of Ink Flow Path Including Negative Pressure Regulation Valve]

Figure 3:
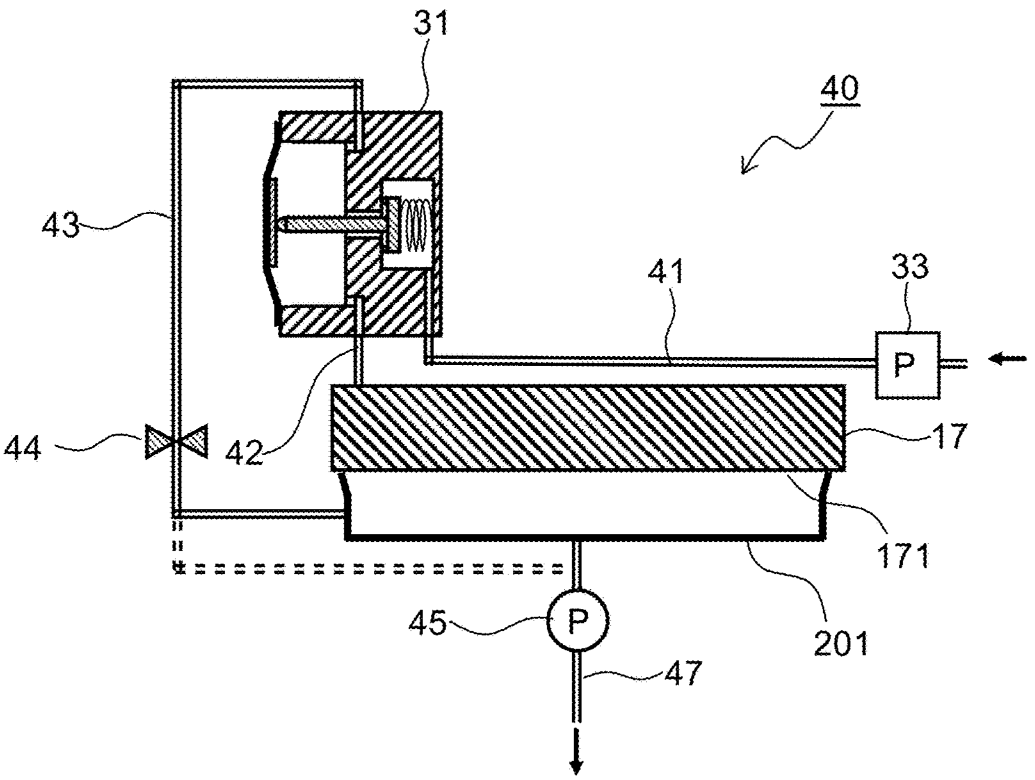
FIG. 3 is a schematic configuration diagram illustrating an arrangement of an ink flow path, a negative pressure regulation valve, and a recording head, the latter two being connected to the ink flow path.

FIG. 3 is a schematic configuration diagram illustrating an arrangement of an ink flow path 40, a negative pressure regulation valve 31, and a recording head 17, the latter two being connected to the ink flow path 40. In the following description, the recording heads 17*a* to 17*c* will be simply referred to as the recording head 17. Further, up-down directions in FIGS. 3 and 4 correspond to a vertical direction (a direction of gravity).

The ink flow path 40 includes an ink inflow path 41, a first outflow path 42, and a second outflow path 43. Between the ink inflow path 41 and both the first outflow path 42 and the second outflow path 43, the negative pressure regulation valve 31 is connected.

Ink having been introduced from the ink container 30 (see FIG. 1) into the ink flow path 40 is supplied to the recording head 17 via the ink inflow path 41, the negative pressure regulation valve 31, and the first outflow path 42. The second outflow path 43 connects the negative pressure regulation valve 31 and an inside of the cap 201. The second outflow path 43 is provided with an opening/closing valve 44.

To the ink inflow path 41, a pressure pump 33 is connected. The pressure pump 33 maintains pressure inside an inflow-side pressure chamber 50 (see FIG. 4) at a constant pressure that is higher than pressure inside an outflow-side pressure chamber 51 (see FIG. 4).

Note that a configuration may be adopted in which the pressure pump 33 is not provided and the ink container 30 is disposed at a position higher than the negative pressure regulation valve 31 to use hydraulic head pressure of ink to maintain constant pressure inside the inflow-side pressure chamber 50. In a case where a sub tank (unillustrated) is disposed between the ink container 30 and the negative pressure regulation valve 31, the sub tank is located at a position higher than the negative pressure regulation valve 31.

To the recording head 17, the cap 201 is attached. The cap 201 is supported in the cap unit 20 (see FIG. 1), and is attached to an ink ejection surface (nozzle surface) 171 of the recording head 17 when no printing process is to be executed for a certain period of time or longer. With the cap 201 attached, the ink ejection surface 171 of the recording head 17 is maintained in a sealed state. In the cap 201, a flow path (unillustrated) is provided that communicates with atmosphere. This flow path is openable and closable so that change of temperature in a space between the ink ejection surface 171 and the cap 201 will not cause excessive change of pressure in nozzles 18 of the recording head 17. To the cap 201, a suction pump 45 and a waste ink discharge path 47 are connected.

In the printer 100, in order to prevent insides of the ink ejection ports 18 (see FIG. 2) of the recording head 17 from becoming dry and to remove thickened ink, foreign matter, etc., from the insides of the ink ejection ports 18, when printing is started after a long period of stop, and between printing operations, the suction pump 45 performs, with the cap 201 attached to the ink ejection surface 171 and the flow path communicating with atmosphere closed, a suction purge process by sucking air from the space (sealed space) between the ink ejection surface 171 and the cap 201 to forcibly suck out ink from all the ink ejection ports 18 of the recording head 17, so as to be ready for the next printing operation. The ink (purged ink) having been sucked out from the recording head 17 into the inside of the cap 201 is discharged by the suction pump 45 to an outside of the cap 201, and is then collected via the waste ink discharge path 47 in a waste ink tank (unillustrated).

The suction purge process is also executed when initially filling the ink flow path 40 with an initial filling liquid or ink, when replacing the initial filling liquid in the ink flow path 40 with the ink, and when discharging air, foreign matter, etc., from inside the ink flow path 40.

In the present embodiment, the first outflow path 42 communicates with the recording head 17, and the second outflow path 43 communicates with the inside of the cap 201. In this configuration, liquid inside the first outflow path 42 is sucked by the suction pump 45 into the inside of the cap 201 via the recording head 17, and the liquid flows out to the waste ink discharge path 47. Further, liquid inside the second outflow path 43 is sucked by the suction pump 45 into the inside of the cap 201, and the liquid flows out to the waste ink discharge path 47. Thus, as compared with pressure applied to the ink ejection ports (nozzles) 18 of the recording head 17, pressure applied inside the outflow-side pressure chamber 51 becomes higher. Consequently, even if the suction pump 45 generates a negative pressure with an increased absolute value, there is no risk of a meniscus inside the ink ejection ports 18 being drawn to allow entry of bubbles into the ink ejection ports 18.

[3. Configuration of Negative Pressure Regulation Valve]

Figure 4:
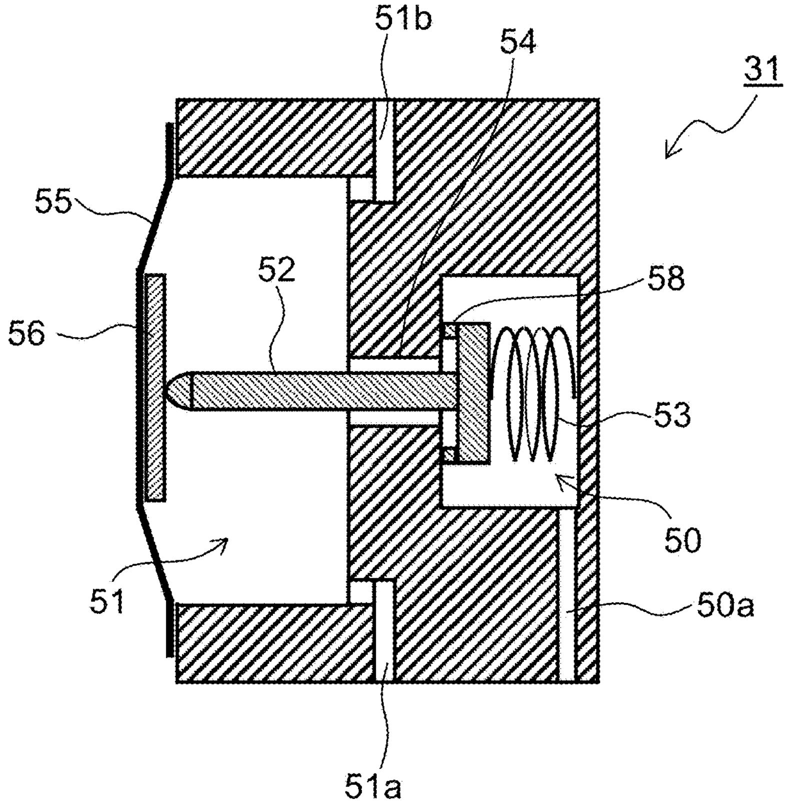
FIG. 4 is a side sectional view of the negative pressure regulation valve.

FIG. 4 is a side sectional view of the negative pressure regulation valve 31 used in the printer 100 of the present embodiment. The negative pressure regulation valve 31 stores therein ink that flows in the ink flow path 40, and also functions as a pressure regulation valve that opens and closes the ink flow path 40 in accordance with pressure on a side of the recording head 17. The negative pressure regulation valve 31 includes the inflow-side pressure chamber 50, the outflow-side pressure chamber 51, a valve member 52, and an opening/closing pressure regulation spring 53.

The inflow-side pressure chamber 50 includes an ink inflow hole 50*a* to which the ink inflow path 41 is coupled. The inflow-side pressure chamber 50 has a predetermined capacity for storing ink having flowed in through the ink inflow hole 50*a*. The inflow-side pressure chamber 50 communicates with the outflow-side pressure chamber 51 via a communication hole 54. In the inflow-side pressure chamber 50, one end part (a large-diameter part) of the valve member 52, which is capable of closing the communication hole 54, and the opening/closing pressure regulation spring 53 are housed.

The outflow-side pressure chamber 51 includes a first outflow hole 51*a*, to which the first outflow path 42 is coupled, a second outflow hole 51*b*, to which the second outflow path 43 is coupled, and a diaphragm portion 55. The outflow-side pressure chamber 51 stores ink having flowed in through the communication hole 54. The outflow-side pressure chamber 51 has a capacity that changes with displacement of the diaphragm portion 55.

The first outflow hole 51*a* is connected, via the first outflow path 42, to the recording head 17. The first outflow hole 51*a* is formed at a position lower than the communication hole 54. In the present embodiment, the first outflow hole 51*a* is formed in a lower end part of the outflow-side pressure chamber 51.

The second outflow hole 51*b* is connected, via the second outflow path 43, to the recording head 17. The second outflow hole 51*b* is formed at a position higher than the communication hole 54. In the present embodiment, the second outflow hole 51*b* is formed in an upper end part of the outflow-side pressure chamber 51. In the outflow-side pressure chamber 51, the other end part (a small-diameter part) of the valve member 52 and a pressure receiving plate 56 are housed.

The valve member 52 is movable, in accordance with change of pressure inside the outflow-side pressure chamber 51, to a closing position for closing the communication hole 54, and an opening position for opening the communication hole 54 against a biasing force of the opening/closing pressure regulation spring 53. To an opening part of the communication hole 54 on a side of the inflow-side pressure chamber 50, an O ring 58 is attached. When the valve member 52 is located at the closing position, the one end part (the large-diameter part) of the valve member 52 is in contact with the O ring 58. When the valve member 52 is located at the opening position, the one end part (the large-diameter part) of the valve member 52 is separated from the O ring 58.

The diaphragm portion 55 is formed of a flexible resin film having a multi-layer structure. The diaphragm portion 55 is fixed to an outer side surface of the outflow-side pressure chamber 51 with a predetermined slack. The diaphragm portion 55 is displaced in accordance with change of pressure inside the outflow-side pressure chamber 51, thereby changing the capacity of the outflow-side pressure chamber 51.

The pressure receiving plate 56 is secured to an inner side surface (a resin layer facing the outflow-side pressure chamber 51) of the diaphragm portion 55, and is integrally movable with the diaphragm portion 55. At a central position on the pressure receiving plate 56, the other end part (the small-diameter part) of the valve member 52 inserted through the communication hole 54 is in contact with the pressure receiving plate 56. On the pressure receiving plate 56, a force acts, due to the biasing force of the opening/closing pressure regulation spring 53, via the valve member 52, in a direction of outwardly displacing (inflating) the diaphragm portion 55.

When ink is consumed in the recording head 17, and the pressure is reduced inside the outflow-side pressure chamber 51, the diaphragm portion 55 is inwardly displaced (deflated). Thereby, the pressure receiving plate 56, against the biasing force of the opening/closing pressure regulation spring 53, pushes the valve member 52 into the inflow-side pressure chamber 50 (the opening position) to open the communication hole 54. As a result, ink is supplied from the inflow-side pressure chamber 50 to the outflow-side pressure chamber 51. Then, when the pressure inside the outflow-side pressure chamber 51 reaches a predetermined negative pressure, the valve member 52 is pushed back into the outflow-side pressure chamber 51 (the closing position) to close the communication hole 54, and the supply of ink from the inflow-side pressure chamber 50 to the outflow-side pressure chamber 51 is stopped. In this manner, pressure is regulated to supply ink to the recording head 17.

In an execution of the suction purge process, the ink ejection surface 171 of the recording head 17 is covered with the cap 201, and, with the flow path allowing communication between the inside of the cap 201 and atmosphere closed, the suction pump 45 sucks air from the space (the sealed space) between the ink ejection surface 171 and the cap 201 to generate a negative pressure. Thereby, the valve member 52 moves to the opening position to open the communication hole 54, allowing the liquid (the ink or the initial filling liquid) inside the recording head 17 to be discharged through the ink ejection ports 18.

At this time, the outflow-side pressure chamber 51 inside the negative pressure regulation valve 31 has a negative pressure, and the valve member 52 is pushed by the diaphragm portion 55. As a result, the valve member 52 moves into the inflow-side pressure chamber 50 against the biasing force of the opening/closing pressure regulation spring 53 to open the communication hole 54, allowing communication between the inflow-side pressure chamber 50 and the outflow-side pressure chamber 51. Thereby, the liquid flows from the ink container 30, via the ink inflow path 41, the negative pressure regulation valve 31, and the first outflow path 42, into the recording head 17. Further, the liquid, passing through the ink inflow path 41, the negative pressure regulation valve 31, and the second outflow path 43, flows into the inside of the cap 201.

Figure 5:
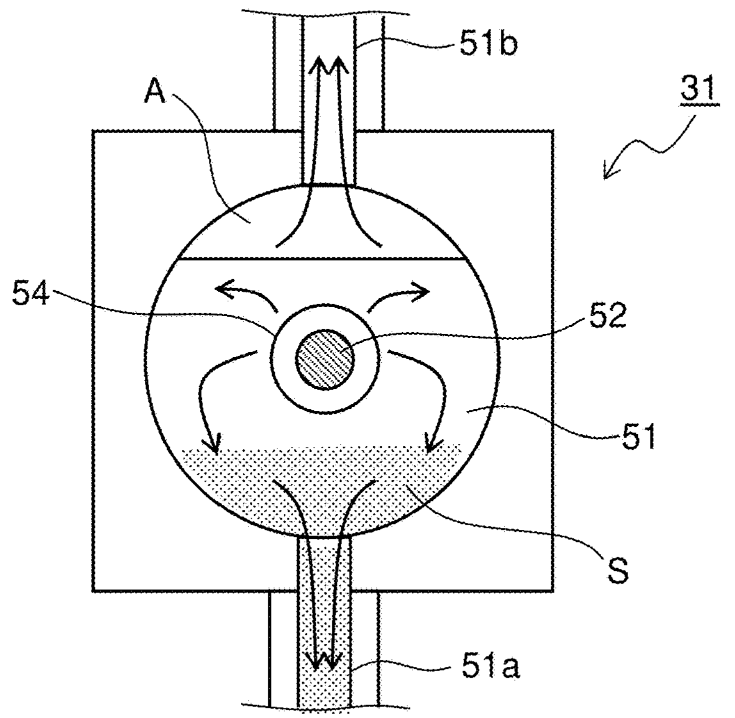
FIG. 5 is a schematic diagram illustrating the negative pressure regulation valve as seen from a front side, the diagram illustrating how solid matter S and air are discharged during an execution of a suction purge process.

FIG. 5 is a schematic diagram illustrating the negative pressure regulation valve 31 as seen from the front side (the left side in FIG. 4), the diagram illustrating how liquid (the initial filling liquid or the ink) and air are discharged during an execution of the suction purge process. Solid matter S such as a solidified ink component, foreign matter, etc., included in the liquid caused by the suction purge process to flow from the communication hole 54 into the outflow-side pressure chamber 51, stays in a lower part of the outflow-side pressure chamber 51. Thus, the solid matter S flows out from the first outflow hole 51*a* formed in the lower part of the outflow-side pressure chamber 51, via the first outflow path 42, into the recording head 17.

Further, air A contained in the liquid that flows into the outflow-side pressure chamber 51 stays in an upper part of the outflow-side pressure chamber 51. Thus, the air A flows out from the second outflow hole 51*b* formed in the upper part of the outflow-side pressure chamber 51, via the second outflow path 43, into the inside of the cap 201.

According to the configuration of the present embodiment, the solid matter S inside the outflow-side pressure chamber 51 smoothly and efficiently flows out from the first outflow hole 51*a*, which is disposed below the communication hole 54, via the first outflow path 42, and thus does not remain in the outflow-side pressure chamber 51. Further, the air A inside the outflow-side pressure chamber 51 smoothly and efficiently flows out from the second outflow hole 51*b*, which is disposed above the communication hole 54, via the second outflow path 43, and thus does not remain in the outflow-side pressure chamber 51.

In a case where the suction purge process is executed prior to shipment of the printer 100 to thereby fill the ink flow path 40, in an empty state, with the initial filling liquid or the ink, it is preferable to keep the opening/closing valve 44 in an open state for a predetermined period of time from a start of the suction purge process.

Flow path resistance of the second outflow path 43 extending from the second outflow hole 51*b* of the outflow-side pressure chamber 51 to the cap 201 is lower than flow path resistance of a flow path extending from the first outflow hole 51*a* via the first outflow path 42 and the recording head 17 to the cap 201 by flow path resistance of the recording head 17. Thus, when the opening/closing valve 44 is in the open state, the liquid in the outflow-side pressure chamber 51 hardly flows to the first outflow hole 51*a*, but chiefly flows from the second outflow hole 51*b* into the second outflow path 43.

Together with this flow of the liquid, air inside the outflow-side pressure chamber 51 is discharged from the second outflow hole 51*b*, via the second outflow path 43, to the cap 201. The opening/closing valve 44 is brought into a closed state after the predetermined period of time has passed and the suction purge process is continued, whereby a normal purge is executed in which liquid is allowed to flow from the first outflow hole 51*a* via the first outflow path 42 to the recording head 17 to fill the recording head 17 with the initial filling liquid or the ink.

The above-described execution of the suction purge process makes it possible to discharge the air inside the negative pressure regulation valve 31 more efficiently, and thus to further reduce a flow amount of the initial filling liquid or the ink allowed to flow to fill the ink flow path 40. Further, since no air is allowed to flow on the side of the recording head 17, the recording head 17 can be filled with the initial filling liquid or the ink with improved efficiency.

Furthermore, also in a case where the suction purge process is executed when the printer 100 is installed so as to replace the initial filling liquid inside the ink flow path 40 with the ink, or, in a case where, after the printer 100 is put in use, bubbles having entered the ink flow path 40 are discharged, it is preferable to keep the opening/closing valve 44 in the open state for the predetermined period of time from the start of the suction purge process. The operation of keeping the opening/closing valve 44 in the open state for the predetermined period of time after the start of the suction purge process may be performed in each execution of the suction purge process, or may be performed once in a predetermined number of executions (once in a plurality of executions) of the suction purge process.

The flow path resistance of the flow path extending from the second outflow hole 51*b* of the outflow-side pressure chamber 51 via the second outflow path 43 to the cap 201 is lower, as compared to the flow path resistance of the flow path extending from the first outflow hole 51*a* via the first outflow path 42 and the recording head 17 to the cap 201 by the flow path resistance of the recording head 17. Thus, when the opening/closing valve 44 is in the open state, the liquid in the outflow-side pressure chamber 51 hardly flows to the first outflow hole 51*a*, but chiefly flows from the second outflow hole 51*b* into the second outflow path 43.

Together with this flow of the liquid, the initial filling liquid having a lower density than the ink is discharged from the second outflow hole 51*b* to the cap 201. The opening/closing valve 44 is brought into the closed state after the predetermined period of time has passed and the suction purge process is continued, whereby a normal purge is executed in which the ink is allowed to flow from the first outflow hole 51*a* via the first outflow path 42 to the recording head 17 to replace the initial filling liquid in the recording head 17 with the ink.

The above-described execution of the suction purge process makes it possible to discharge the initial filling liquid inside the negative pressure regulation valve 31 more efficiently, and thus to further reduce a flow amount of the ink allowed to flow to be replaced with the initial filling liquid inside the ink flow path 40. Further, since no initial filling liquid is allowed to flow on the side of the recording head 17, the replacement of the initial filling liquid with the ink can be performed inside the recording head 17 with improved efficiency.

In the case where the suction purge process is performed with the opening/closing valve 44 in the open state as described above, if the suction pump 45 is stopped when the opening/closing valve 44 is in the open state, the air inside the cap 201 may flow back through the second outflow path 43 into the outflow-side pressure chamber 51 of the negative pressure regulation valve 31. To prevent this, the control device 110 (see FIG. 1) continues driving the suction pump 45 while the opening/closing valve 44 is in the open state.

Note that, in a case where ink component solidification or foreign matter intrusion occurs while the printer 100 is in use, the opening/closing valve 44 is brought into the closed state and the normal suction purge process is executed. Thereby, the solid matter S flows out from the first outflow hole 51*a* via the first outflow path 42 in a smooth and efficient manner. Consequently, it is possible to avoid the problem of the solid matter S being trapped in a space between the valve member 52 and the communication hole 54, preventing the valve member 52 from moving.

Moreover, with the first outflow path 42 communicating with the recording head 17 and the second outflow path 43 communicating with the inside of the cap 201, as compared with pressure applied to the ink ejection ports (nozzles) 18 of the recording head 17 due to the suction pump 45, a higher pressure is applied inside the outflow-side pressure chamber 51 due to the suction pump 45. Consequently, it is possible to avoid misfiring of ink caused by a meniscus inside the ink ejection ports 18 being drawn in, allowing entry of bubbles.

Figure 6:
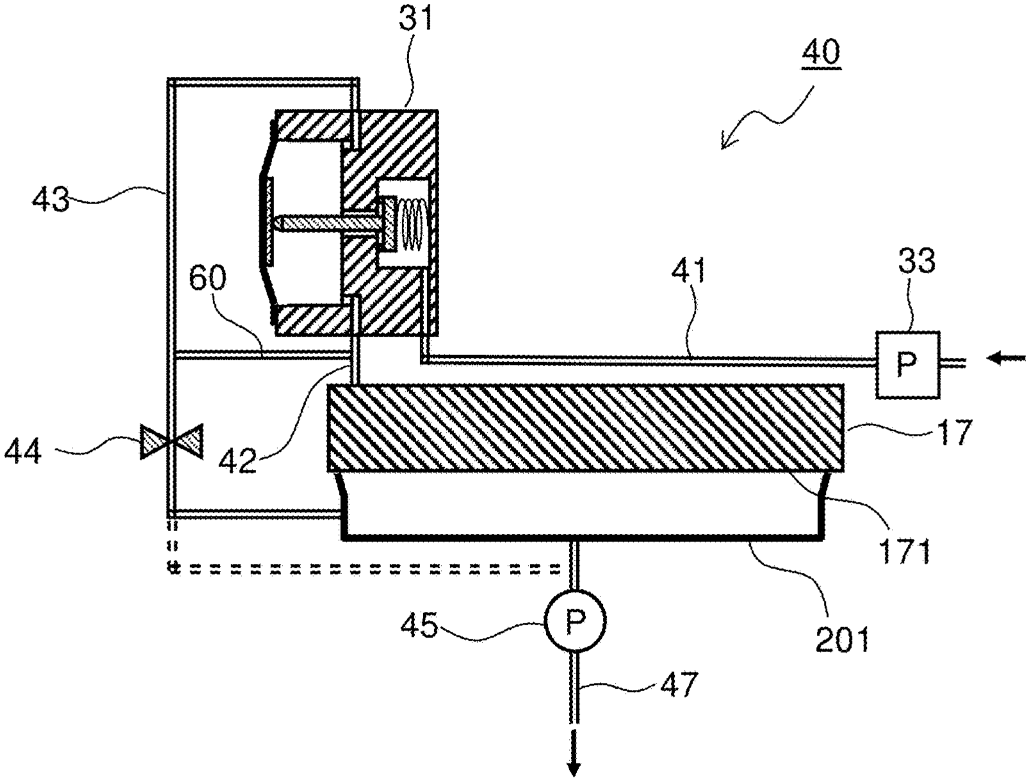
FIG. 6 is a diagram illustrating a modified example of the ink flow path, the modified example including a bypass flow path that allows communication between the first outflow path and the second outflow path.

FIG. 6 is a diagram illustrating a modified example of the ink flow path 40, the modified example including a bypass flow path 60 that allows communication between the first outflow path 42 and the second outflow path 43. As shown in FIG. 6, it is possible to provide the bypass flow path 60 that allows communication between the first outflow path 42 and such part of the second outflow path 43 as is located upstream of the opening/closing valve 44 (part between the negative pressure regulation valve 31 and the opening/closing valve 44).

It should be understood that the present disclosure is not limited to the above embodiments, and various modifications are possible within the scope of the present disclosure. For example, in the above embodiment, the second outflow path 43 allows communication between the second outflow hole 51*b* of the negative pressure regulation valve 31 and the inside of the cap 201, but instead, as indicated by broken lines in FIG. 3 and FIG. 6, the second outflow path 43 may communicate with the waste ink discharge path 47 between the suction pump 45 and the cap 201. In this case, bubbles and the initial filling liquid discharged from the second outflow hole 51*b* do not pass through the cap 201 but are discharged directly into the waste ink discharge path 47.

Further, exemplified in the above embodiment as components connected to the ink flow path 40 are the recording head 17, the negative pressure regulation valve 31, the pressure pump 33, and the suction pump 45, but the present disclosure is applicable to configurations where other components are connected to the ink flow path 40.

Further, described in the above embodiment is an example where used as an inkjet recording apparatus is a color printer which records color images using inks in four colors, the ink supply unit of the present embodiment is usable also in a case where a monochrome printer is used which records a monochrome image using a black ink.

The present disclosure is usable in inkjet recording apparatuses, such as inkjet printers, provided with a negative pressure regulation valve between an ink container and a recording head.

What is claimed is:

1. An inkjet recording apparatus, comprising;

an ink container that contains ink;

one or more recording heads having a plurality of nozzles that eject the ink;

an ink flow path that allows communication between the ink container and the recording heads;

a negative pressure regulation valve connected to the ink flow path;

a cap that is attached to an ink ejection surface of the recording heads and capable of forming a sealed space between the ink ejection surface and the cap;

a suction pump that sucks air from an inside of the cap; and a waste ink discharge path that discharges liquid having been sucked by the suction pump into the inside of the cap, the inkjet recording apparatus being capable of executing, with the cap attached to the ink ejection surface, a suction purge process in which the suction pump sucks air from the sealed space, wherein the negative pressure regulation valve includes an inflow-side pressure chamber including an ink inflow hole that communicates with an ink inflow path that is the ink flow path on a side of the ink container, an outflow-side pressure chamber that communicates with an ink outflow path that is the ink flow path on a side of the recording heads, a communication hole that allows communication between the inflow-side pressure chamber and the outflow-side pressure chamber, a first outflow hole that is formed in the outflow-side pressure chamber so as to be below the communication hole, and that communicates with a first outflow path that is the ink outflow path, a second outflow hole that is formed in the outflow-side pressure chamber so as to be above the communication hole, and that communicates with a second outflow path that is the ink outflow path, and a valve member inserted in the communication hole and movable, in accordance with change of pressure inside the outflow-side pressure chamber, to a closing position for closing the communication hole and an opening position for opening the communication hole, the first outflow path communicates with the recording heads, the second outflow path communicates with the inside of the cap or the waste ink discharge path between the suction pump and the cap, and an opening/closing valve is provided that opens and closes the second outflow path.

2. The inkjet recording apparatus according to claim 1, wherein in a case where the suction purge process is executed, with the ink flow path in an empty state, to thereby fill the ink flow path with an initial filling liquid or the ink, the opening/closing valve is kept in an open state for a predetermined period of time from a start of the suction purge process, and after the predetermined period of time has passed, the opening/closing valve is brought into a closed state, and the suction purge process is continued.

3. The inkjet recording apparatus according to claim 2, further comprising a control portion that controls driving of the suction pump, wherein the control portion continues the driving of the suction pump while the opening/closing valve is in the open state.

4. The inkjet recording apparatus according to claim 1, wherein in a case where the suction purge process is executed, with the ink flow path filled with an initial filling liquid, to thereby replace the initial filling liquid inside the ink flow path with the ink, the opening/closing valve is kept in an open state for a predetermined period of time after the suction purge process is started, and after the predetermined period of time has passed, the opening/closing valve is brought into a closed state, and the suction purge process is continued.

5. The inkjet recording apparatus according to claim 1, wherein the negative pressure regulation valve further includes a diaphragm portion that constitutes part of the outflow-side pressure chamber and that is displaced by pressure change inside the outflow-side pressure chamber, thereby changing capacity of the outflow-side pressure chamber, and a biasing member that biases the valve member in a direction toward the closing position, and the valve member is caused by displacement of the diaphragm portion and a biasing force of the biasing member to move to the closing position and the opening position.

6. The inkjet recording apparatus according to claim 1, wherein in a case where the suction purge process is executed to thereby discharge a bubble having entered the ink flow path after the printer is put in use, in each execution of the suction purge process, or once in a predetermined number of executions of the suction purge process, the opening/closing valve is kept in an open state for a predetermined period of time from a start of the suction purge process, and after the predetermined period of time has passed, the opening/closing valve is brought into a closed state, and the suction purge process is continued.

* * * * *